(12) United States Patent
Kitamura

(10) Patent No.: US 8,768,422 B2
(45) Date of Patent: Jul. 1, 2014

(54) SLIDING-TYPE MOBILE ELECTRONIC DEVICE

(75) Inventor: Nobuyuki Kitamura, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/635,331

(22) PCT Filed: Mar. 25, 2011

(86) PCT No.: PCT/JP2011/057327
§ 371 (c)(1),
(2), (4) Date: Sep. 14, 2012

(87) PCT Pub. No.: WO2011/122467
PCT Pub. Date: Oct. 6, 2011

(65) Prior Publication Data
US 2013/0005411 A1 Jan. 3, 2013

(30) Foreign Application Priority Data
Mar. 29, 2010 (JP) .................................. 2010-075863

(51) Int. Cl.
*H04B 1/38* (2006.01)

(52) U.S. Cl.
USPC ...................... 455/575.4; 455/566; 455/550.1

(58) Field of Classification Search
USPC ...................... 455/575.4, 566, 550.1; 361/752
See application file for complete search history.

(56) References Cited

U.S. PATENT DOCUMENTS

| 2008/0004083 | A1* | 1/2008 | Ohki et al. ..................... 455/566 |
| 2008/0182435 | A1* | 7/2008 | Ho et al. ........................... 439/77 |
| 2009/0029741 | A1* | 1/2009 | Satou et al. .................... 455/566 |
| 2010/0073890 | A1* | 3/2010 | Miller et al. ................... 361/752 |
| 2010/0195296 | A1* | 8/2010 | Nishiwaki ...................... 361/752 |
| 2010/0240426 | A1 | 9/2010 | Tanaka et al. |

FOREIGN PATENT DOCUMENTS

| JP | 2009-71364 A | 4/2009 |
| JP | 2009-88733 A | 4/2009 |
| JP | 2009-188866 A | 8/2009 |
| JP | 2009-188916 A | 8/2009 |
| WO | 2006/038499 A1 | 4/2006 |
| WO | 2009/041610 A1 | 4/2009 |

* cited by examiner

*Primary Examiner* — Jinsong Hu
*Assistant Examiner* — Jean Chang
(74) *Attorney, Agent, or Firm* — Procopio, Cory, Hargreaves & Savitch LLP

(57) ABSTRACT

A sliding-type mobile electronic device that can be easily assembled and can reduce restrictions of circuit design is provided. The sliding-type mobile electronic device according to the present invention includes a first cabinet 1 in which a circuit board is incorporated, a second cabinet 2 that is slidably connected to the first cabinet, in which an electric constituent is mounted, and a flexible lead 6 drawn from the electric constituent, passed through an opening provided in the first cabinet, and connected to the circuit board 5. The flexible lead has an overlapped portion 63 in which a part of the flexible lead is folded on a predetermined region F provided on a front surface of the circuit board.

10 Claims, 9 Drawing Sheets

F I G. 7
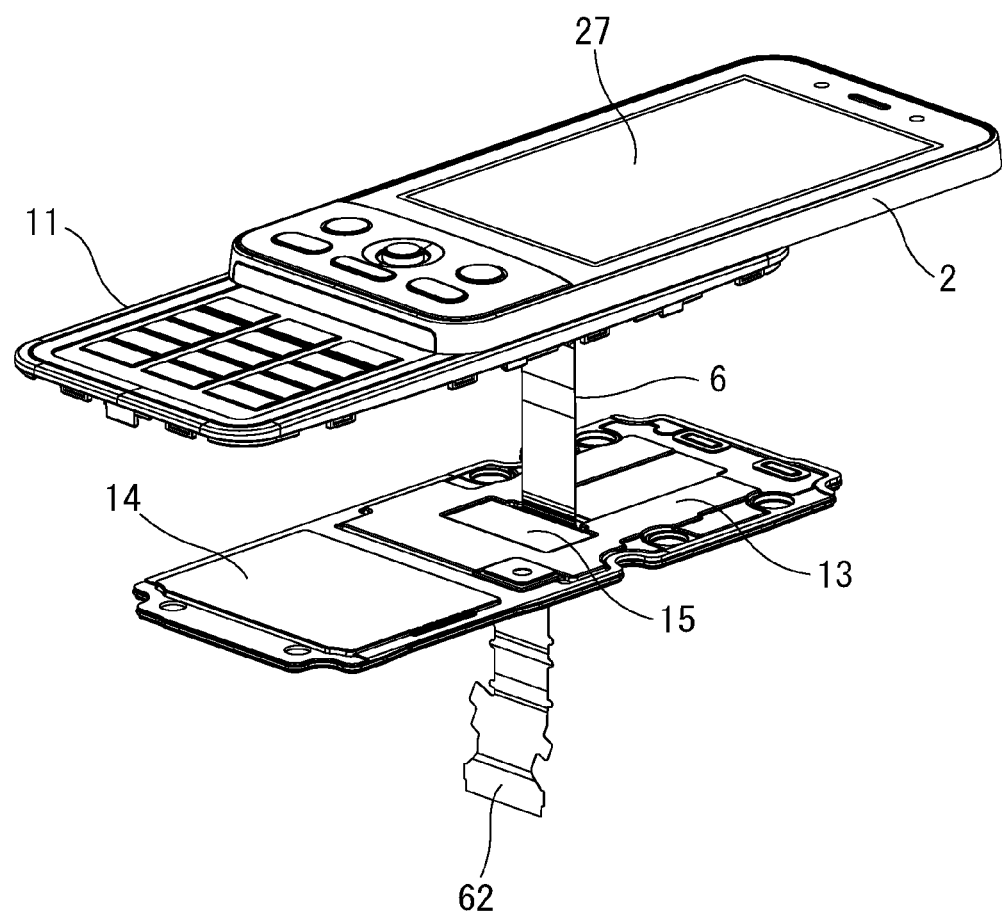

SLIDING-TYPE MOBILE ELECTRONIC DEVICE

TECHNICAL FIELD

The present invention relates a sliding-type mobile electronic device such as a sliding-type mobile phone that is configured by slidably connecting two cabinets to each other.

BACKGROUND ART

A sliding-type mobile phone includes a device main body configured by slidably connecting a first cabinet to a second cabinet, an operation portion configured by a plurality of operation keys are arranged on a front surface of the first cabinet, and a display portion configured by a liquid crystal display panel is arranged on a front surface of the second cabinet (for example, see Patent Document 1). The device main body relatively moves the first cabinet and the second cabinet in the sliding direction to make it possible to change a state between a closed state in which both the cabinets are closed such that at least a part of the operation portion is covered with the second cabinet and an open state in which both the cabinets are opened such that an entire area of the operation portion is exposed.

In the sliding-type mobile phone, a flexible lead is connected to an electric constituent such as the liquid crystal display panel mounted in the second cabinet, and the flexible lead is drawn from a rear surface of the second cabinet, thereafter, passed through an opening formed through the front surface of the first cabinet, and connected to a circuit board incorporated in the first cabinet (for example, see Patent Document 2).

More specifically, the first cabinet is configured by engaging a front-surface-side case half body that forms the front surface of the first cabinet to a rear-surface-side case half body that forms the rear surface of the first cabinet, an opening through which the flexible lead passes is formed in the front-surface-side case half body, and the circuit board is installed in the rear-surface-side case half body.

In the assembling step for the sliding-type mobile phone, the flexible lead drawn from the rear surface of the second cabinet is caused to pass through the opening of the front-surface-side case half body, and the tip end of the flexible lead is then connected to a connector on the circuit board. Thereafter, the front-surface-side case half body and the rear-surface-side case half body are engaged to each other to form the first cabinet.

PRIOR ART DOCUMENT

Patent Document

Patent Document 1: Japanese Patent Laid-open Publication No. 2009-71364
Patent Document 2: Japanese Patent Laid-open Publication No. 2009-88733

SUMMARY OF THE INVENTION

Problems to be Solved by the Invention

In this case, in order to facilitate assemblage of the sliding-type mobile phone such as connection of the flexible lead to the connector on the circuit board, a linear dimension of the flexible lead is set to be larger than a minimum linear dimension required for the flexible lead in an assembling state. Thus, in the assembling state, the flexible lead has an additional portion (to be referred to as an excessive portion hereinafter). The excessive portion of the flexible lead is stored in the first cabinet. As a result, a part of the front surface of the circuit board is covered with the excessive portion. For this reason, on the front surface of the circuit board, an electronic component cannot be mounted in a region covered with the flexible lead.

It is an object of the present invention to provide a sliding-type mobile electronic device that can be easily assembled and can reduce restrictions of circuit design.

Means for Solving the Problems

A sliding-type mobile electronic device according to the present invention includes a first cabinet in which a circuit board is incorporated, a second cabinet that is slidably connected to the first cabinet, in which an electric constituent is mounted, and a flexible lead drawn from the electric constituent, passed through an opening provided in the first cabinet, and connected to the circuit board, the flexible lead having an overlapped portion in which a part of the flexible lead is folded on a predetermined region provided on a front surface of the circuit board.

In the sliding-type mobile electronic device, in order to facilitate assemblage of the sliding-type mobile device such as connection of the flexible lead to the circuit board, a linear dimension of the flexible lead is set to be larger than a minimum linear dimension required for the flexible lead in an assembling state. Thus, in the assembling state, the flexible lead has an excessive portion. The excessive portion of the flexible lead is stored in the first cabinet. As a result, a part of the front surface of the circuit board is covered with the excessive portion.

In the sliding-type mobile electronic device, the excessive portion of the flexible lead is folded on the predetermined region provided on the front surface of the circuit board. In this manner, the flexible lead has an overlapped portion in which the excessive portion is overlapped on the predetermined region.

Therefore, even when a linear dimension of the excessive portion of the flexible lead increases, a region of the front surface of the circuit board covered with the flexible lead can be suppressed from spreading from the predetermined region to the outside. Thus, a region in which an electronic component is mounted does not decrease on the circuit board. As a result, restrictions of circuit design can be reduced. The linear dimension of the excessive portion of the flexible lead is increased to make it easy to assemble the sliding-type mobile electronic device.

Effects of the Invention

The sliding-type mobile electronic device according to the present invention can be easily assembled and can reduce restrictions of circuit design.

BRIEF DESCRIPTION OF THE DRAWINGS

FIG. 7 is a perspective view used in a description of the first step in a procedure of assembling the sliding-type mobile phone.

DETAILED DESCRIPTION OF EMBODIMENTS

An embodiment in which the present invention is applied to a sliding-type mobile phone will be concretely described below with reference to the accompanying drawings.

Figure 1:
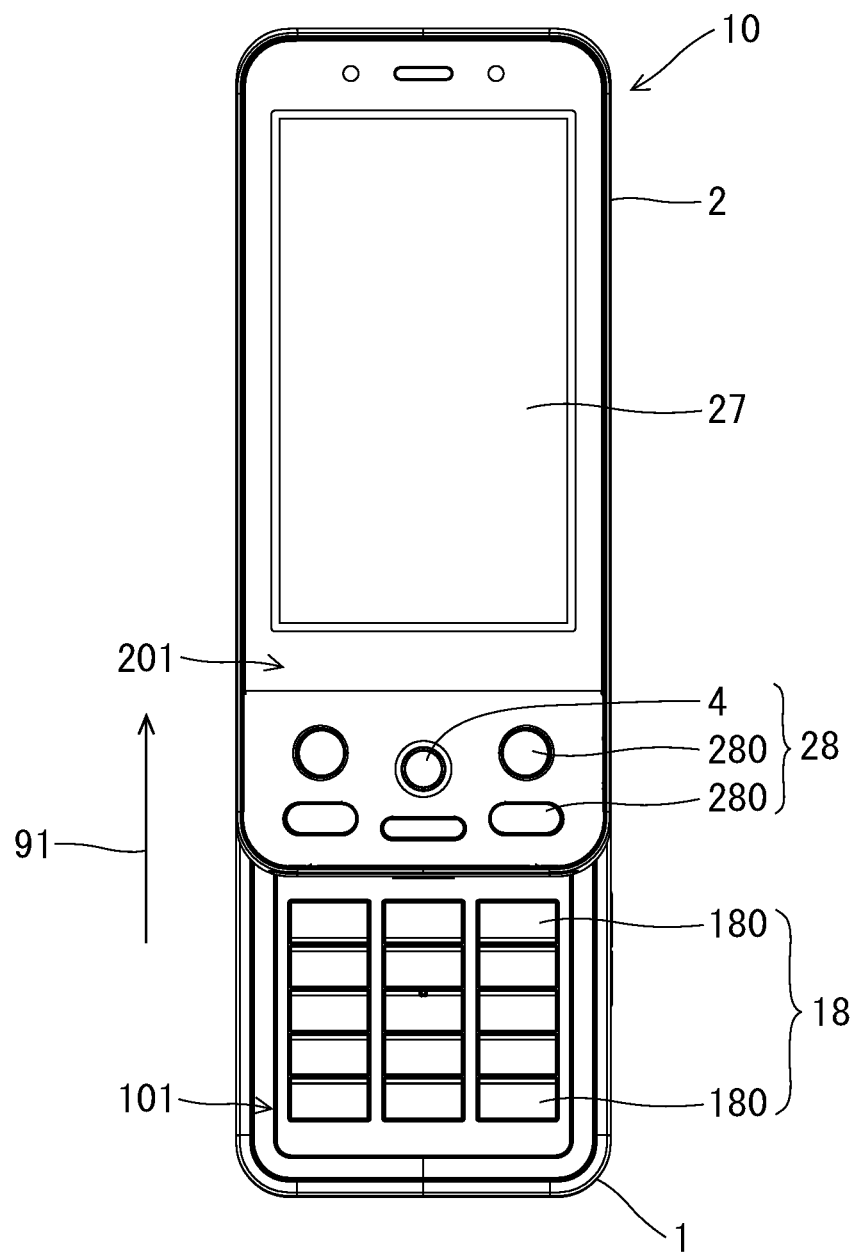
FIG. 1 is a front view showing a sliding-type mobile phone according to an embodiment of the present invention.

FIG. 1 is a front view showing a sliding-type mobile phone according to an embodiment of the present invention. As shown in FIG. 1, the sliding-type mobile phone includes a device main body 10 configured by slidably connecting a first cabinet 1 to a second cabinet 2.

On a front surface 101 of the first cabinet 1, a first operation portion 18 configured by a plurality of operation keys 180 to 180 are installed. On a front surface 201 of the second cabinet 2, a display portion configured by a liquid crystal display panel 27 is installed, and in a region different from a region in which the liquid crystal display panel 27 is installed, a second operation portion 28 configured by a lever switch 4 and a plurality of operation keys 280 to 280 is installed. The lever switch can perform a lever operation such that the lever switch 4 is slid in a total of eight directions including four vertical and horizontal directions and their four oblique directions, and a lever operation such that the lever switch 4 is depressed toward the second cabinet 2.

Figure 2:
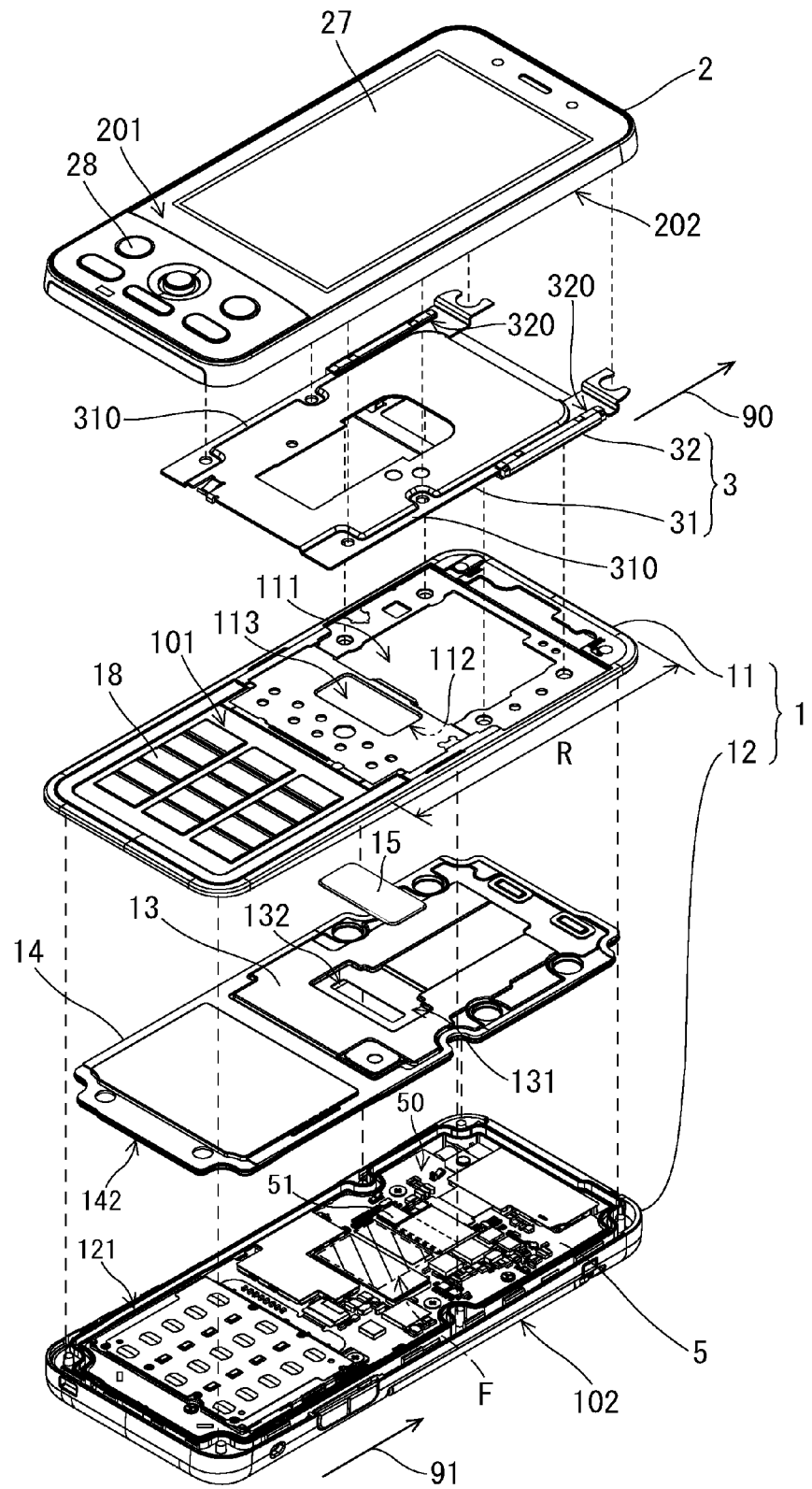
FIG. 2 is an exploded perspective view of the sliding-type mobile phone.

FIG. 2 is an exploded perspective view of the sliding-type mobile phone. In FIG. 2, a flexible lead 6 (described later) is not illustrated. As shown in FIG. 2, a sliding mechanism 3 that slidably connects the first cabinet 1 and the second cabinet 2 to each other is arranged therebetween, and the sliding mechanism 3 is configured by a slide body 31 and a slide regulating portion 32. The slide body 31 is fixed to one counter-facing surface (i.e., a rear surface 202 of the second cabinet 2) at the side of the second cabinet 2 out of counter-facing surfaces between the first cabinet 1 and the second cabinet 2. On the other hand, the slide regulating portion 32 is fixed to another counter-facing surface (i.e., the front surface 101 of the first cabinet 1) at the side of the first cabinet 1 out of the counter-facing surfaces between the first cabinet 1 and the second cabinet 2, more specifically, fixed to a region different from the installation region of the first operation portion 18.

On both the end positions of the slide regulating portion 32 are formed one pair of left and right guide hooks 320, 320, with which left and right edge portions 310, 310 of the slide body 31 are slidably engaged. In this manner, a slide direction 90 of the slide body 31 is regulated in a longitudinal direction 91 of the first cabinet 1 by the slide regulating portion 32. Thus, the second cabinet 2 can relatively move with respect to the first cabinet 1 along the longitudinal direction 91 of the first cabinet 1.

Figure 3:
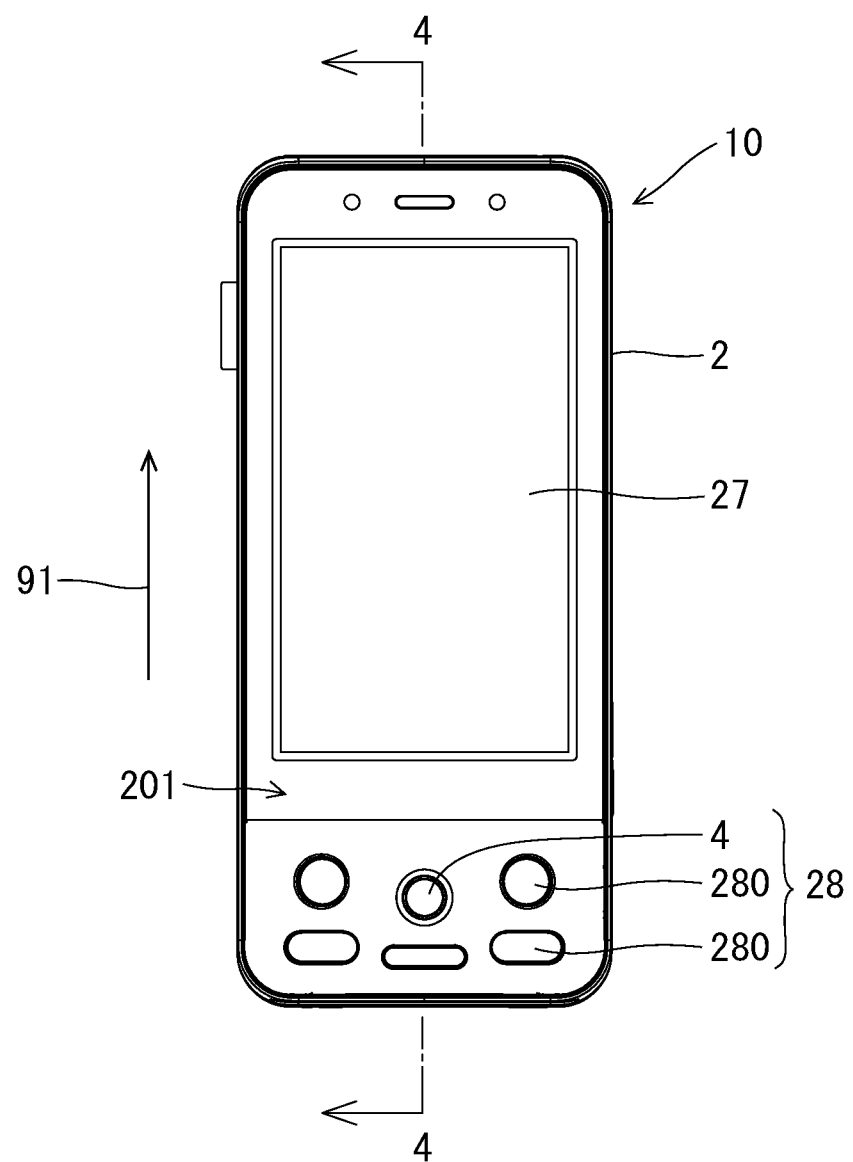
FIG. 3 is a front view used in a description of a closed state of a device main body of the sliding-type mobile phone.

For this reason, the device main body 10 of the sliding-type mobile phone relatively moves the first cabinet 1 with respect to the second cabinet 2 to make it possible to change a state between a closed state in which both the cabinets 1, 2 are closed as shown in FIG. 3 such that the entire area of the first operation portion 18 is covered with the second cabinet 2 and an open state in which both the cabinets 1, 2 are opened as shown in FIG. 1 such that the entire area of the first operation portion 18 is exposed. On the front surface 101 of the first cabinet 1, as shown in FIG. 2, even when the device main body 10 is set to any one of the closed state and the open state, a covered region R that is covered with the second cabinet 2 is provided.

A user of the sliding-type mobile phone can operate the sliding-type mobile phone by using the first operation portion 18 and the second operation portion 28 when the device main body 10 is set to the open state as shown in FIG. 1. As shown in FIG. 3, even when the device main body 10 is set to the closed state, the user can operate the sliding-type mobile phone by using the second operation portion 28.

As shown in FIG. 2, in a part of the covered region R of the front surface 101 of the first cabinet 1, an opening 111 is formed. The flexible lead 6 (described later) (see FIG. 6) is passed through the opening 111. A circuit board 5 is incorporated in the first cabinet 1, the circuit board 5 has a shape spreading in a wide range along the front surface 101 of the first cabinet 1. Thus, with the circuit board 5, at least the installation region of the first operation portion 18 and the covered region R of the front surface 101 of the first cabinet 1 are overlapped.

More specifically, the first cabinet 1 is configured by engaging a front-surface-side case half body 11 on which the front surface 101 of the first cabinet 1 is formed to a rear-surface-side case half body 12 on which a rear surface 102 of the first cabinet 1 is formed. The opening 111 of the first cabinet 1 is formed in the front-surface-side case half body 11, and the circuit board 5 is installed in the rear-surface-side case half body 12.

On the engaging surface of the rear-surface-side case half body 12 out of the engaging surfaces of the front-surface-side case half body 11 and the rear-surface-side case half body 12, an annular groove 121 extending to surround an installation region of the circuit board 5 is formed.

As shown in FIG. 2, at an inner surface side of the front-surface-side case half body 11 of the first cabinet 1, a metal plate 13 covering a region of a front surface 50 of the circuit board 5 on which the covered region R is to overlap and a seal member 14 to be interposed between the engaging surfaces of the front-surface-side case half body 11 and the rear-surface-side case half body 12 are arranged. In this case, the seal member 14 spreads from a region between the engaging surfaces of the front-surface-side case half body 11 and the rear-surface-side case half body 12 to the inner side of the first cabinet 1 to cover an entire area of a region of the front surface 50 of the circuit board 5 which is not covered with the metal plate 13. The metal plate 13 and the seal member 14 are integrally formed without any gap therebetween.

A seal portion 142 to be fitted into the annular groove 121 of the rear-surface-side case half body 12 is protruded from the seal member 14 toward the annular groove 121. In an assembling state of the first cabinet 1, the seal portion 142 of the seal member 14 is fitted into the annular groove 121 of the rear-surface-side case half body 12, and the front-surface-side case half body 11 and the rear-surface-side case half body 12 are engaged to each other. In this manner, the seal portion 142 is depressed into the annular groove 121 by the engaging surface of the front-surface-side case half body 11. As a result, the seal portion 142 of the seal member 14 is fitted into the annular groove 121 without any gap.

On a front surface of the metal plate 13, a concave portion 131 is formed in a region different from a region to be exposed in the opening 111 of the first cabinet 1 in the assembling state of the first cabinet 1, and an opening 132 is formed in a bottom portion of the concave portion 131. To the bottom portion of the concave portion 131, a waterproof sheet 15 that seals the opening 132 formed in the bottom portion is stuck and fixed. In this manner, the waterproof sheet 15 is bonded to the bottom portion of the concave portion 131. As will be described later (see FIG. 6), the flexible lead 6 passing through the opening 111 of the first cabinet 1 passes between bonding surfaces of the bottom portion of the concave portion 131 and the waterproof sheet 15, and then passes through the opening 132 formed in the bottom portion of the concave portion 131.

On the other hand, the front-surface-side case half body 11 of the first cabinet 1 is partially bent and deformed to be upraised to the inner surface side to form an upraised portion 112 at a position facing the concave portion 131 of the metal plate 13. The front-surface-side case half body 11 is partially bent and deformed to form a recession 113 on the front surface 101 of the front-surface-side case half body 11.

In the assembling state of the first cabinet 1, the upraised portion 112 of the front-surface-side case half body 11 is fitted into the concave portion 131 of the metal plate 13. As a result, the waterproof sheet 15 is compressed between the upraised portion 112 and the bottom portion of the concave portion 131. Thus, even when water externally enters the opening 111 of the front-surface-side case half body 11, the water is suppressed from passing through the opening 132 formed in the bottom portion of the concave portion 131 by the waterproof sheet 15.

According to the configuration of the first cabinet 1, the ingress of water can be suppressed by the seal member 14 between the engaging surfaces of the front-surface-side case half body 11 and the rear-surface-side case half body 12. Furthermore, even when water from the front surface 101 side of the first cabinet 1 enters the first cabinet 1, the water is suppressed from reaching the circuit board 5 by the metal plate 13 and the seal member 14 that are integrally formed. Thus, the metal plate 13 and the seal member 14 function as waterproof members that cover the circuit board 5.

Thus, water outside the first cabinet 1 is suppressed from reaching the circuit board 5 by a waterproof member configured by the metal plate 13 and the seal member 14, and the waterproof sheet 15. In this manner, in the sliding-type mobile phone, a waterproof structure that makes the circuit board 5 water-proof is arranged.

Figure 4:
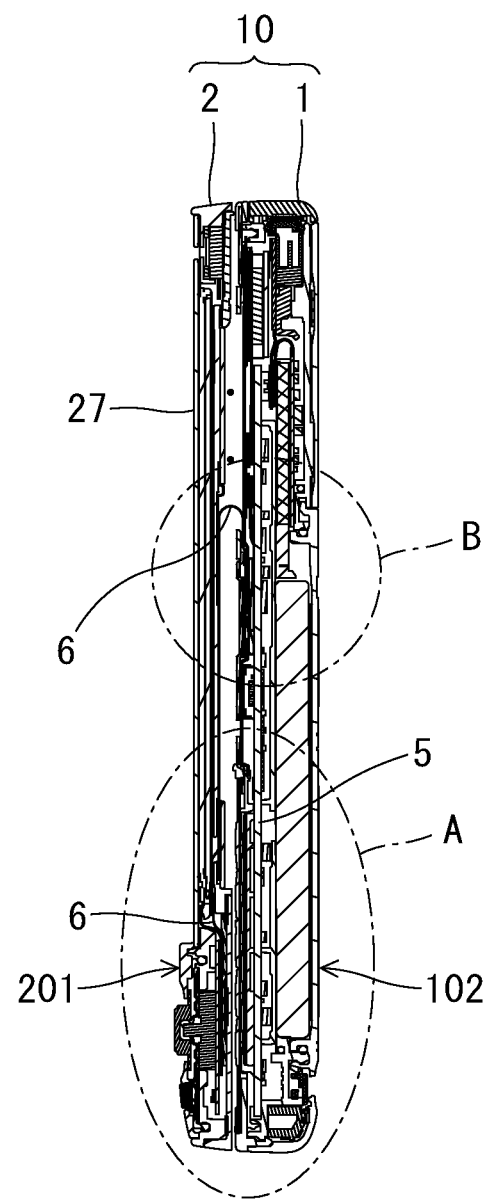
FIG. 4 is a sectional view along a 4-4 line shown in FIG. 3.
Figure 5:
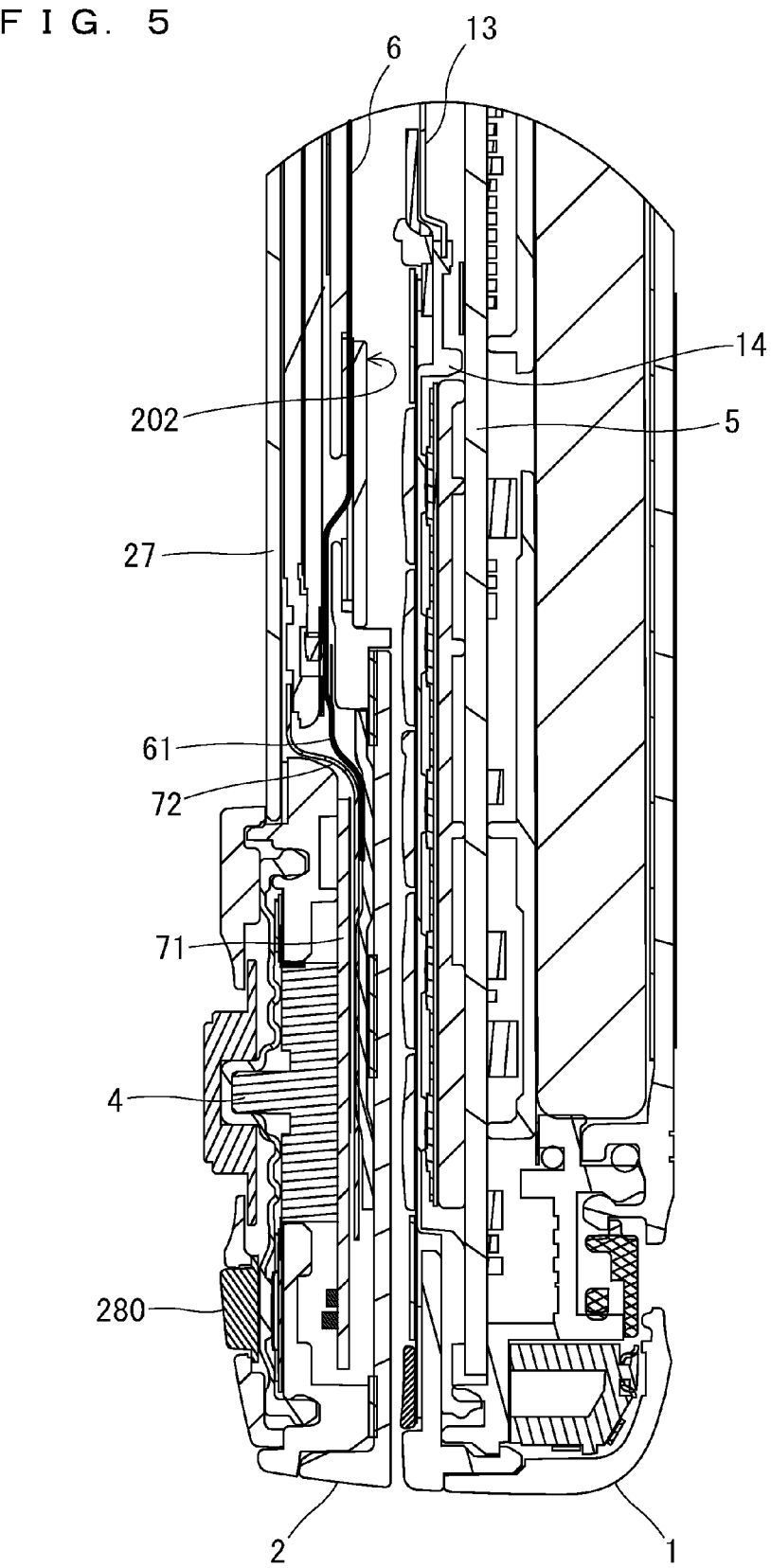
FIG. 5 is an enlarged view of an A region shown in FIG. 4.

FIG. 4 is a sectional view along a 4-4 line shown in FIG. 3. FIG. 5 is an enlarged view of an A region shown in FIG. 4. As shown in FIG. 5, the flexible lead 6 is drawn from the rear surface 202 of the second cabinet 2, and a base end portion 61 of the flexible lead 6 is connected to a circuit board 71 incorporated in the first cabinet 1. An electronic component such as the lever switch 4 is mounted on the circuit board 71, and the liquid crystal display panel 27 is electrically connected to the circuit board 71 through a second flexible lead 72.

Thus, the base end portion 61 of the flexible lead 6 is electrically connected to the electric constituents such as the liquid crystal display panel 27 and the lever switch 4 mounted in the second cabinet 2. In this manner, the flexible lead 6 is drawn from the electric constituents mounted in the second cabinet 2.

Figure 6:
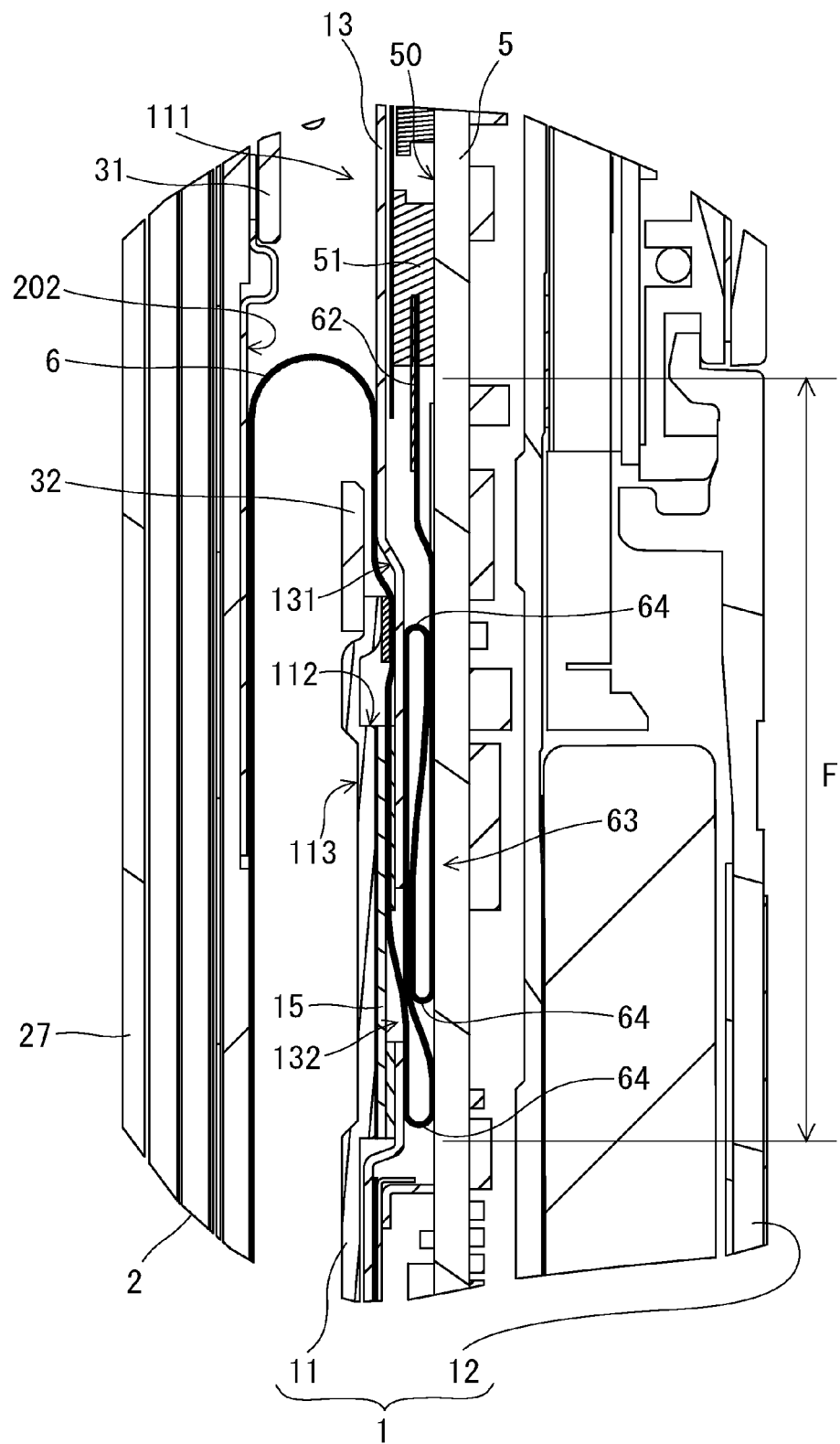
FIG. 6 is an enlarged view of a B region shown in FIG. 4.

FIG. 6 is an enlarged view of a B region shown in FIG. 4. As shown in FIG. 6, the flexible lead 6 drawn from the rear surface 202 of the second cabinet 2 extends along the rear surface 202 of the second cabinet 2, passes through the opening 111 formed in the front-surface-side case half body 11 of the first cabinet 1, and is connected to the circuit board 5 in the first cabinet 1.

More specifically, the flexible lead 6 drawn from the rear surface 202 of the second cabinet 2 extends upward along the rear surface 202 of the second cabinet 2, curves in a U shape to pass through the opening 111 of the front-surface-side case half body 11, and extends downward along the front surface of the metal plate 13. The flexible lead 6 extending downward along the front surface of the metal plate 13 passes between the bonding surfaces of the bottom portion of the concave portion 131 and the waterproof sheet 15, and then passes through the opening 132 formed in the bottom portion of the concave portion 131. A connector 51 is installed on the front surface 50 of the circuit board 5 (also see FIG. 2), and the tip end portion 62 of the flexible lead 6 is connected to the connector 51 in a direction along the front surface 50 of the circuit board 5.

As shown in FIG. 6, a part of the flexible lead 6 is folded on a predetermined region F provided on the front surface 50 of the circuit board 5 to form an overlapped portion 63 in which the part is overlapped on the predetermined region F on the flexible lead 6. In this case, the predetermined region F is provided on the front surface 50 of the circuit board 5 to be adjacent to an installation region of the connector 51 (also see FIG. 2).

More specifically, the part of the flexible lead 6 is folded and bent at three positions to form three bent portions 64 to 64, and the three bent portions 64 to 64 constitute the overlapped portion 63. The three bent portions 64 to 64 are arranged on the predetermined region F to be shifted from each other.

A procedure of assembling the sliding-type mobile phone will be concretely described below with reference to the drawings.

FIG. 7 is a perspective view used in a description of the first step in the assembling procedure. As shown in FIG. 7 (also see FIG. 2 and FIG. 6), in the first step, the front-surface-side case half body 11 of the first cabinet 1 and the second cabinet 2 are slidably connected to each other with the sliding mechanism 3. At this time, the flexible lead 6 drawn from the rear surface 202 of the second cabinet 2 is caused to pass through the opening 111 of the front-surface-side case half body 11.

In the first step, furthermore, the flexible lead 6 is caused to pass through the opening 132 formed in the bottom portion of the concave portion 131 of the metal plate 13. In this state, the waterproof sheet 15 is stuck and fixed to the bottom portion of the concave portion 131 to seal the opening 132. In this manner, the flexible lead 6 passes between the bonding surface of the bottom portion of the concave portion 131 and the waterproof sheet 15 and is fixed to the metal plate 13 in this state.

Figure 8:
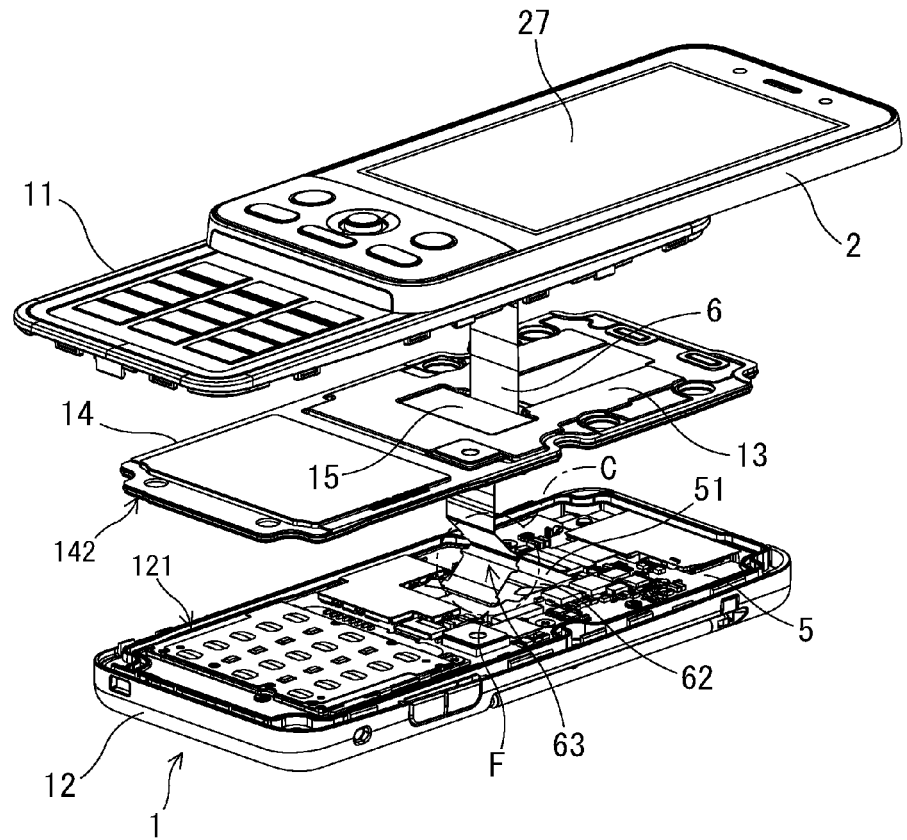
FIG. 8 is a perspective view used in a description of the second step in the assembling procedure.

FIG. 8 is a perspective view used in a description of the second step in the assembling procedure. As shown in FIG. 8 (also see FIG. 2 and FIG. 6), in the second step, the tip end portion 62 of the flexible lead 6 is connected to the connector 51. Thereafter, a part of the flexible lead 6 is folded on the predetermined region F provided on the front surface 50 of the circuit board 5 to form the overlapped portion 63 of the flexible lead 6.

Figure 9:
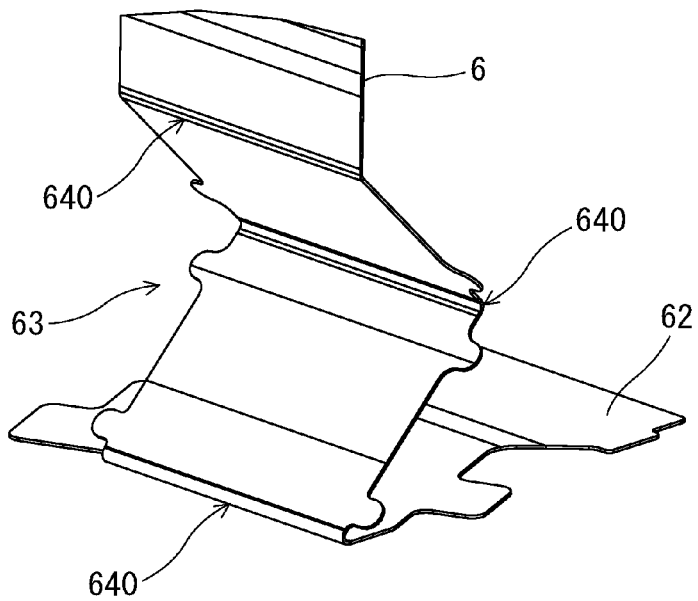
FIG. 9 is an enlarged view of a C region shown in FIG. 8.

FIG. 9 is an enlarged view of a C region shown in FIG. 8. As shown in FIG. 9, a fold line 640 is formed in advance at a position where the flexible lead 6 is folded and bent to facilitate the folding on the predetermined region F.

Figure 10:
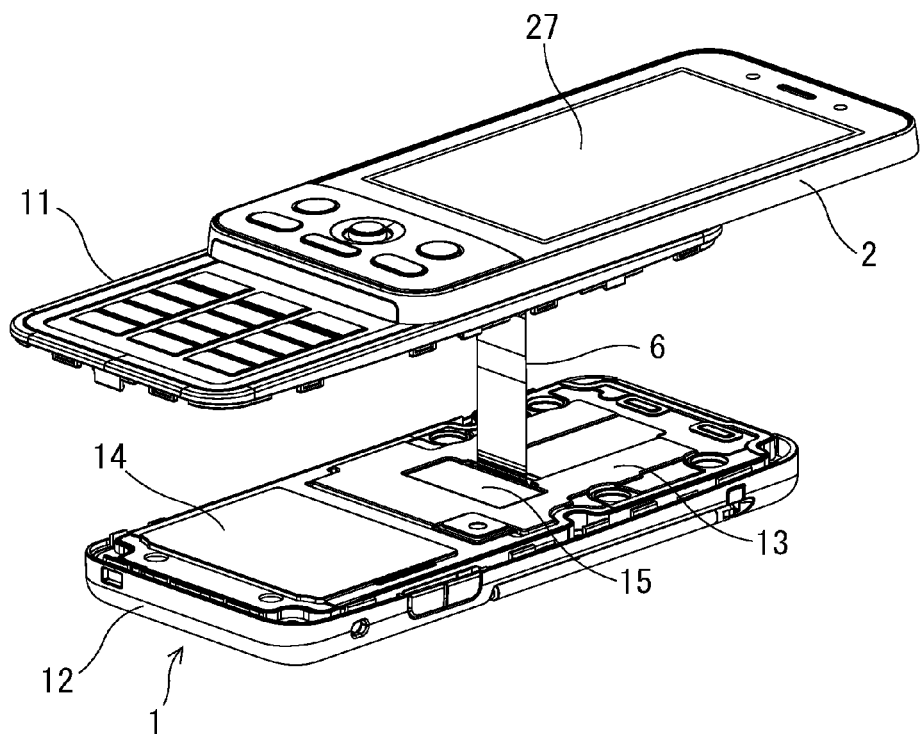
FIG. 10 is a perspective view used in a description of the third step in the assembling procedure.

FIG. 10 is a perspective view used in a description of the third step in the assembling procedure. As shown in FIG. 10 (also see FIG. 2 and FIG. 6), in the third step, the seal member 14 formed integrally with the metal plate 13 is fitted on the rear-surface-side case half body 12 of the first cabinet 1 so that the metal plate 13 and the seal member 14 cover the front surface 50 of the circuit board 5. At this time, the seal portion 142 of the seal member 14 is fitted into the annular groove 121 of the rear-surface-side case half body 12.

Figure 11:
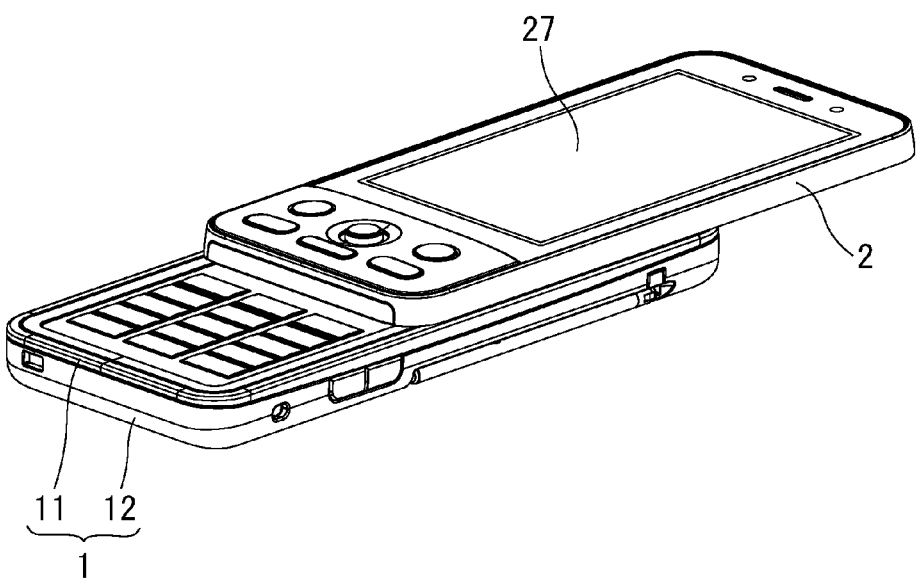
FIG. 11 is a perspective view used in a description of the fourth step in the assembling procedure.

FIG. 11 is a perspective view used in a description of the fourth step in the assembling procedure. As shown in FIG. 11, in the fourth step, the front-surface-side case half body 11 of the first cabinet 1 and the rear-surface-side case half body 12 are engaged to each other to complete the first cabinet 1. In this manner, the seal portion 142 of the seal member 14 is depressed into the annular groove 121 with the engaging surface of the front-surface-side case half body 11. As a result, the seal portion 142 is fitted in the annular groove 121 without any gap. The upraised portion 112 of the front-surface-side case half body 11 is fitted into the concave portion 131 of the metal plate 13. As a result, the waterproof sheet 15 is compressed between the upraised portion 112 and the bottom portion of the concave portion 131.

In the completed sliding-type mobile phone, the flexible lead 6 is fixed to the metal plate 13 while passing between the bonding surfaces of the bottom portion of the concave portion 131 and the waterproof sheet 15, and the tip end portion 62 is connected to the connector 51 and then fixed. Thus, a portion of the flexible lead 6 extending from the metal plate 13 to the connector 51 is not changed in shape even when a slide operation of the sliding-type mobile phone is executed. More specifically, once the shape of the overlapped portion 63 of the flexible lead 6 is determined upon completion of the sliding-type mobile phone, the overlapped portion 63 is not changed in shape thereafter. Thus, although the flexible lead 6 is bent at the overlapped portion 63 as described above, wires formed on the flexible lead 6 can be made difficult to be disconnected.

In the sliding-type mobile phone, in order to facilitate assemblage of the sliding-type mobile phone such as connection of the flexible lead 6 to the connector 51 on the circuit board 5, a linear dimension of the flexible lead 6 is set to be larger than a minimum linear dimension required for the flexible lead 6 in an assembling state. Thus, in the assembling state, the flexible lead 6 has an excessive portion.

In particular, as in the sliding-type mobile phone, in the configuration having a water-proof structure provided therein, in order to facilitate not only the connection of the flexible lead 6 to the connector 51 on the circuit board 5 but also fitting of the seal member 14 on the rear-surface-side case half body 12 of the first cabinet 1, the linear dimension of the flexible lead 6 must be set to be larger than that in a sliding-type mobile phone that does not have a water-proof structure.

According to the sliding-type mobile phone, the excessive portion of the flexible lead 6 is folded on the predetermined region F provided on the front surface 50 of the circuit board 5. For this reason, the overlapped portion 63 in which the excessive portion is overlapped on the predetermined region F is formed on the flexible lead 6.

Therefore, even when a linear dimension of the excessive portion of the flexible lead 6 increases, the region of the front surface 50 of the circuit board 5 covered with the flexible lead 6 can be suppressed from spreading from the predetermined region F to the outside. Thus, a region in which an electronic component is mounted does not decrease on the circuit board 5. As a result, restrictions of circuit design can be reduced. The linear dimension of the excessive portion of the flexible lead 6 is increased to make it easy to assemble the sliding-type mobile phone.

In the sliding-type mobile phone, the plurality of bent portions 64 formed on the flexible lead 6 in the assembling state of the sliding-type mobile phone are arranged to be shifted from each other on the predetermined region F. Thus, the bent portions 64 can be suppressed from being compressed by each other. Thus, even when the plurality of bent portions 64 are formed on the flexible lead 6, wires formed on the flexible lead 6 can be made difficult to be disconnected.

Furthermore, in the sliding-type mobile phone, the tip end portion 62 of the flexible lead 6 is connected to the connector 51 in a direction along the front surface 50 of the circuit board 5. Thus, in comparison with a configuration in which the tip end portion 62 of the flexible lead 6 is connected to the connector 51 in a direction perpendicular to the front surface 50 of the circuit board 5, a thickness of the first cabinet 1 can be made smaller.

On the other hand, in the sliding-type mobile phone, the flexible lead 6 must be laterally deviously connected to the connector 51. For this reason, in comparison with the configuration in which the tip end portion 62 of the flexible lead 6 is connected to the connector 51 in the direction perpendicular to the front surface 50 of the circuit board 5, the linear dimension of the flexible lead 6 becomes larger. Nevertheless, according to the sliding-type mobile phone, for the same reason as described above, the mounting region of the electronic components on the circuit board 5 does not decrease. As a result, restrictions of circuit design can be reduced.

The configuration of the components in the present invention is not limited to the above embodiment, and various changes and modifications can be effected without departing from the spirit and scope of the invention. For example, a part of the flexible lead 6 is folded and bent at one or two positions to form the one or two bent portion 64. The one or two bent portion 64 may configure the overlapped portion 63. A part of the flexible lead 6 is folded and bent at a plurality of positions (three or more positions) to form the plurality of bent portions 64. The plurality of bent portions 64 may configure the overlapped portion 63. Furthermore, a manner of shifting the plurality of bent portions 64 on the predetermined region F is not limited to the embodiment shown in FIG. 6.

The configurations employed in the sliding-type mobile phone can be applied to various sliding-type mobile electronic devices such as a PDA (Personal Digital Assistant). The configuration employed in the flexible lead 6 can also be applied to a flexible lead arranged in a sliding-type mobile electronic device that does not have a waterproof structure.

DESCRIPTION OF REFERENCE CHARACTERS

10 Device main body
1 First cabinet
101 Front surface
102 Rear surface
11 Front-surface-side case half body
111 Opening
12 Rear-surface-side case half body
121 Annular groove
13 Metal plate
131 Concave portion
132 Opening
14 Seal member
142 Seal portion
15 Waterproof sheet
2 Second cabinet
201 Front surface
202 Rear surface
27 Liquid crystal display panel (electric constituent)
3 Sliding mechanism
31 Slide body
310 Edge portion 32 Slide regulating portion
320 Guide hook
4 Lever switch (electric constituent)
5 Circuit board
50 Front surface
51 Connector
6 Flexible lead
61 Base end portion
62 Tip end portion
63 Overlapped portion
64 Bent portion
640 Fold line
R Covered region
F Predetermined region

The invention claimed is:

1. A sliding-type mobile electronic device comprising:
a first cabinet;
a circuit board incorporated in the first cabinet, the circuit board having a front surface and electronic components mounted on the front surface, the front surface having a predetermined region carrying no electronic components;
a second cabinet that is slidably connected to the first cabinet, in which an electric constituent is mounted; and
a flexible lead drawn from the electric constituent, passed through an opening provided in the first cabinet, and connected to the circuit board, wherein the flexible lead has an overlapped portion in which a part of the flexible lead is folded on said predetermined region of the front surface of the circuit board; and
the overlapped portion includes a plurality of bent portions in which successive parts of the flexible lead are folded, and the plurality of bent portions are shifted from each other on the predetermined region and in a direction along the front surface of the circuit board.

2. The sliding-type mobile electronic device according to claim 1, wherein
the overlapped portion of the flexible lead is folded and bent at least at three positions, whereby the plurality of bent portions include at least three bent portions.

3. The sliding-type mobile electronic device according to claim 1, wherein the overlapped portion does not change in shape during a slide operation of the sliding-type mobile electronic device.

4. The sliding-type mobile electronic device according to claim 3, wherein
the overlapped portion of the flexible lead is folded and bent at least at three positions, whereby the plurality of bent portions include at least three bent portions.

5. The sliding-type mobile electronic device according to claim 1, wherein the overlapped portion is enclosed in the first cabinet.

6. A sliding-type mobile electronic device comprising:
a first cabinet;
a circuit board incorporated in the first cabinet, the circuit board having a front surface and electronic components mounted on the front surface, the front surface having a predetermined region carrying no electronic components;
a second cabinet that is slidably connected to the first cabinet, in which an electric constituent is mounted; and
a flexible lead drawn from the electric constituent, passed through an opening provided in the first cabinet, and connected to the circuit board;
the flexible lead having an overlapped portion in which a part of the flexible lead is folded on said predetermined region of the front surface of the circuit board;
wherein the first cabinet is configured by engaging a front-surface-side case half body forming a front surface to a rear-surface-side case half body forming a rear surface,
the front-surface-side case half body has an opening through which the flexible lead is caused to pass,
the rear-surface-side case half body has the circuit board,
a waterproof member is included which is arranged at the inner surface side of the front-surface-side case half body, covers the circuit board, has an opening through which the flexible lead is caused to pass, and is bonded with a waterproof sheet closing the opening, and
the flexible lead passes between bonding surfaces of the waterproof member and the waterproof sheet, is fixed to the waterproof member, and is connected to the circuit board.

7. The sliding-type mobile electronic device according to claim 6 wherein the waterproof member is interposed between the engaging surfaces of the front-surface-side case half body and the rear-surface-side case half body; and
wherein the overlapped portion of the flexible lead is located between the waterproof member and the circuit board.

8. The sliding-type mobile electronic device according to claim 6, wherein the flexible lead is fixed to the waterproof member such that the overlapped portion is not changed in shape during a slide operation between the first cabinet and the second cabinet.

9. The sliding-type mobile electronic device according to claim 6, wherein the waterproof member includes a seal member and a metal plate; and
wherein the waterproof sheet is configured to fix the flexible lead to the metal plate.

10. A sliding-type mobile electronic device comprising:
a first cabinet;
a circuit board incorporated in the first cabinet, the circuit board having a front surface and electronic components mounted on the front surface, the front surface having a predetermined region carrying no electronic components;
a second cabinet that is slidably connected to the first cabinet, in which an electric constituent is mounted; and
a flexible lead drawn from the electric constituent, passed through an opening provided in the first cabinet, and connected to the circuit board, wherein the flexible lead has an overlapped portion in which a part of the flexible lead is folded on said predetermined region of the front surface of the circuit board; and
the overlapped portion includes a plurality of bent portions in which successive parts of the flexible lead are folded.

* * * * *